(12) United States Patent
Räsänen

(10) Patent No.: US 7,502,624 B2
(45) Date of Patent: Mar. 10, 2009

(54) METHOD OF AND APPARATUS FOR COMMUNICATING

(75) Inventor: Asko Räsänen, Kerava (FI)

(73) Assignee: Nokia Corporation, Espoo (FI)

( * ) Notice: Subject to any disclaimer, the term of this patent is extended or adjusted under 35 U.S.C. 154(b) by 175 days.

(21) Appl. No.: 10/518,690

(22) PCT Filed: Jun. 27, 2003

(86) PCT No.: PCT/IB03/03006

§ 371 (c)(1),
(2), (4) Date: Dec. 15, 2005

(87) PCT Pub. No.: WO2004/006468

PCT Pub. Date: Jan. 15, 2004

(65) Prior Publication Data

US 2006/0252369 A1 Nov. 9, 2006

(30) Foreign Application Priority Data

Jul. 5, 2002 (GB) .................................. 0215622.2

(51) Int. Cl.
*H04M 1/00* (2006.01)
*H04Q 7/20* (2006.01)
(52) U.S. Cl. ................... 455/552.1; 455/41.2; 455/518
(58) Field of Classification Search .............. 455/552.1, 455/553.1, 426.1–426.2, 518, 41.2, 41.3
See application file for complete search history.

(56) References Cited

U.S. PATENT DOCUMENTS

| 5,666,661 | A | | 9/1997 | Grube et al. | |
|---|---|---|---|---|---|
| 5,822,682 | A | * | 10/1998 | Schroderus et al. | ........ 455/63.3 |
| 6,108,551 | A | | 8/2000 | Lehmusto et al. | |
| 6,134,437 | A | | 10/2000 | Karabinis et al. | |
| 6,230,015 | B1 | | 5/2001 | Kinnunen et al. | |
| 2002/0059434 | A1 | * | 5/2002 | Karaoguz et al. | ........... 709/228 |

FOREIGN PATENT DOCUMENTS

| EP | 0 893 922 A2 | 1/1999 |
|---|---|---|
| GB | 2316271 A | 2/1998 |
| WO | WO 01/28266 A1 | 4/2001 |

OTHER PUBLICATIONS

PCT International Search Report (as published), International Application No. PCT/IB2003/003006, Date of Completion of Search—Sep. 18, 2003.
UK Patent Office Search Report of priority UK Application No. GB 0215622.2, Date of Search: Nov. 28, 2002.

\* cited by examiner

*Primary Examiner*—Lee Nguyen
(74) *Attorney, Agent, or Firm*—Morgan & Finnegan, L.L.P.

(57) ABSTRACT

A system for effecting communication between first and second radio transceivers, comprises a communicator for effecting communication between the first and second radio transceivers over a first channel; a determiner for determining the distance between the transceivers, and for determining if the distance falls below a predetermined threshold; and a channel charger responsive to a positive determination, for effecting direct mode communication between the transceivers over a second channel.

18 Claims, 4 Drawing Sheets

METHOD OF AND APPARATUS FOR COMMUNICATING

FIELD OF THE INVENTION

This invention relates to a method of communicating between first and second radio transceivers. This invention relates also to a system, and to a radio transceiver.

BACKGROUND OF THE INVENTION

Various radio channel types exist today for use by portable radio transceivers, global system mobiles (GSM) speech channels, general packet radio service (GPRS), Bluetooth and wireless local area network (WLAN) being examples of such channel types. Furthermore, the universal mobile telephone system (UMTS) allows the transfer of audio-visual information in both directions between portable radio transceivers. The term now adapted for portable radio transceivers of the UMTS standard is mobile station (MS), and this term is used hereafter to describe a mobile radio transceiver capable of communicating in any system.

With many MSs being equipped to communicate with two or more different channel types, it has become common for a user of an MS to have to decide which type of communication channel to use, which can constitute an inconvenience.

SUMMARY OF THE INVENTION

According to a first aspect of the invention, there is provided a method of communicating, the method comprising: effecting communication between first and second radio transceivers via a telecommunications network over a first channel; determining the distance between the first and second radio transceivers; determining whether the distance between the two transceivers meets a predetermined threshold; and in response to a determination that the threshold is met, effecting direct mode communication between the first and second radio transceivers over a second channel.

The invention also includes a radio transceiver, comprising: a communicator for communicating with a remote radio transceiver via a telecommunications network over a first channel; a determiner for determining the distance between the transceiver and the remote transceiver, and for determining whether the distance meets a predetermined threshold; and a channel charger, responsible to a determination that the threshold is met, for effecting direct mode communication between the transceiver and the remote transceiver over a second channel.

The second channel may have a greater bandwidth than the first channel and the first and second channels may be of different channel types. The method may include, prior to the effecting direct mode communication step, estimating the quality of the second channel. The determining steps may be carried out at the first radio transceiver and the distance determination step may include determining the locations of the first and second radio transceivers.

The location determination may involve a satellite-based position system or may involve triangulating from plural fixed radio transceivers, preferably forming part of the telecommunications network.

The direct mode communication step may be effected only if a bandwidth or other service demand exceeds the capability of the first channel.

Moreover, the threshold can be dependent on, preferably equal to, the sum of the radio coverage of the first and second radio transceivers.

The invention also extends to a system for effecting communication between first and second radio transceivers, comprising: a communicator for effecting communication between the first and second radio transceivers over a first channel; a determiner for determining the distance between the transceivers, and for determining if the distance meets a predetermined threshold; and a channel charger responsive to a determination that the threshold is met, for effecting direct mode communication between the transceivers over a second channel.

The invention will now be described, by way of example only, with reference to the accompanying drawings.

DETAILED DESCRIPTION OF THE EMBODIMENTS

Figure 1:
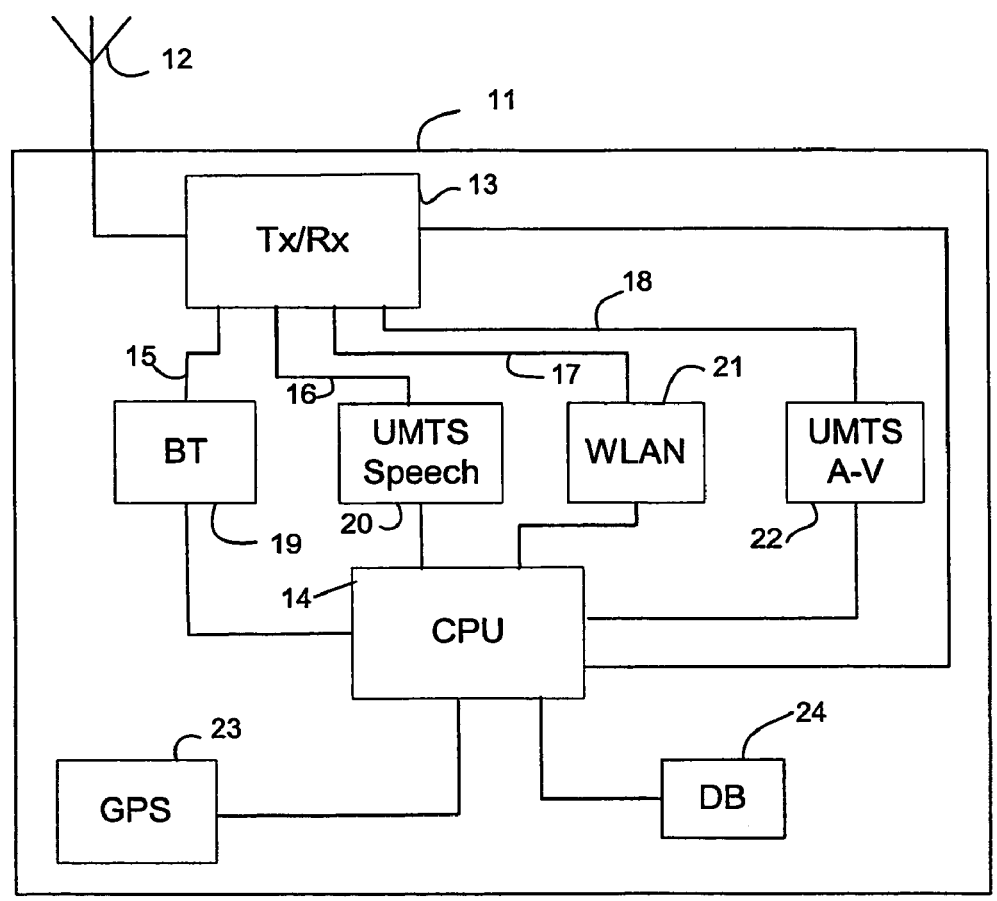
FIG. 1 is a schematic drawing of a mobile station according to one aspect of the invention.

Referring to FIG. 1, a first mobile station (MS) 10 comprises generally a housing 11, an antenna 12, which is connected to transmit and receive circuitry 13, and a central processing unit (CPU) 14. The CPU 14 is connected to the transmit and receive circuitry 13 in four parallel paths 15-18, each path including a respective one of a Bluetooth module 19, a UMTS speech channel module 20, a WLAN module 21 and a UMTS audio-visual module 22. A database 24 containing threshold information, also is connected to the CPU 14. Each of the modules 19 to 22 is configured to allow the first MS 10 to communicate via radio over a different respective channel type. Moreover, each of the channel types has a different bit rate, which equates to bandwidth, namely around 1000 kb/s for UMTS speech, 1 Mb/s for Bluetooth, 10 Mb/s for UMTS A-V, and around 100 MB/s for WLAN. The first MS 10 optionally includes a global positioning system (GPS) receiver 23 which is arranged, in response to a request by the CPU 14, to determine the location of the MS, and to provide location information to the CPU. A receiver operable with another positioning system (such as Glonass or the proposed Galileo) could be used in place of the GPS receiver 23.

Operation of the MS 10 in a telecommunications system will now be described with reference to FIG. 2.

Figure 2:
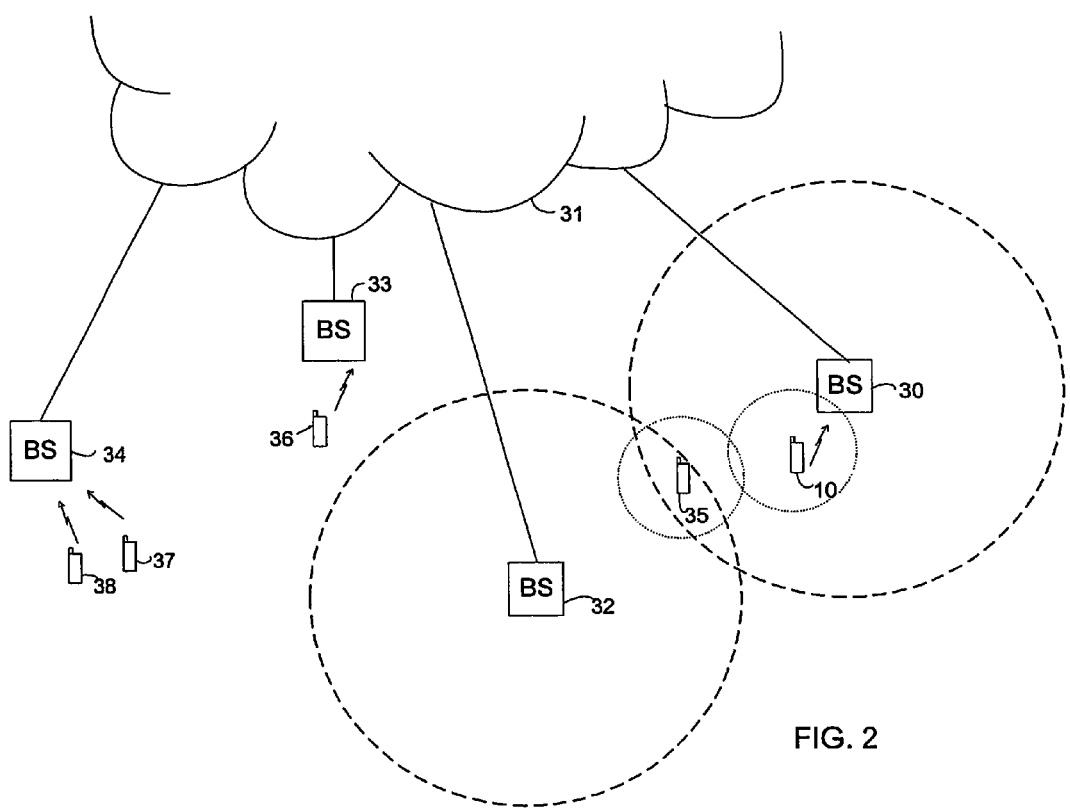
FIG. 2 is a schematic diagram of a telecommunication system according to one aspect of the invention and including the mobile station of FIG. 1.

In FIG. 2, the MS 10 is shown communicating with a first base station (BS) 30 of a UMTS system 31. Second to fourth BSs on 32-34 are shown, along with their respective areas of coverage (the boundaries of which are given by dotted-line circles). Second to fourth MSs 35-38, are shown in communication with, various ones of the BSs 30, 32-34.

In this example, the first MS 10 is connected for speech communication with the second MS 35 over a UMTS speech channel. To this end, the first MS 10 is connected to the BS 30 via a two-way UMTS speech channel, as is the second MS 35. Alternatively, the second MS 35 could be connected via the second BS 32, in which case data would pass between the second BS and the first BS 30 via the network 31, since the second MS is within the area of coverage of both the first and second BSs. It is not important for the purpose of this embodiment which BS or BSs the first and second MSs 10, 35 are using for communication.

On determination that the bandwidth of the channel being used for communication between the first and second MSs 10, 35, which in this example is a UMTS speech channel, is not sufficiently high to communicate, the first MS sets a 'more bandwidth desired' flag (not shown) to TRUE. Examples of situations in which this might occur are when video signals are being communicated, and it is determined that a higher quality of picture is required, or when it is desired to send other data, e.g. gaming data, along with normal speech call data. Another situation when this might occur is when the channel type (and hence the bandwidth) is selected by a user or the users on the basis of cost effectiveness, when a higher bandwidth channel would be desired; for example when a speech call is in progress when a videophone call would be preferred. Since direct mode communication does not involve the transmission of large amounts of data over a network, it may be much cheaper than network calls, or even without charge. As long as the 'more bandwidth desired' flag remains TRUE, the software operation given by the flowchart of FIG. 3 is run on the first MS 10.

Figure 3:
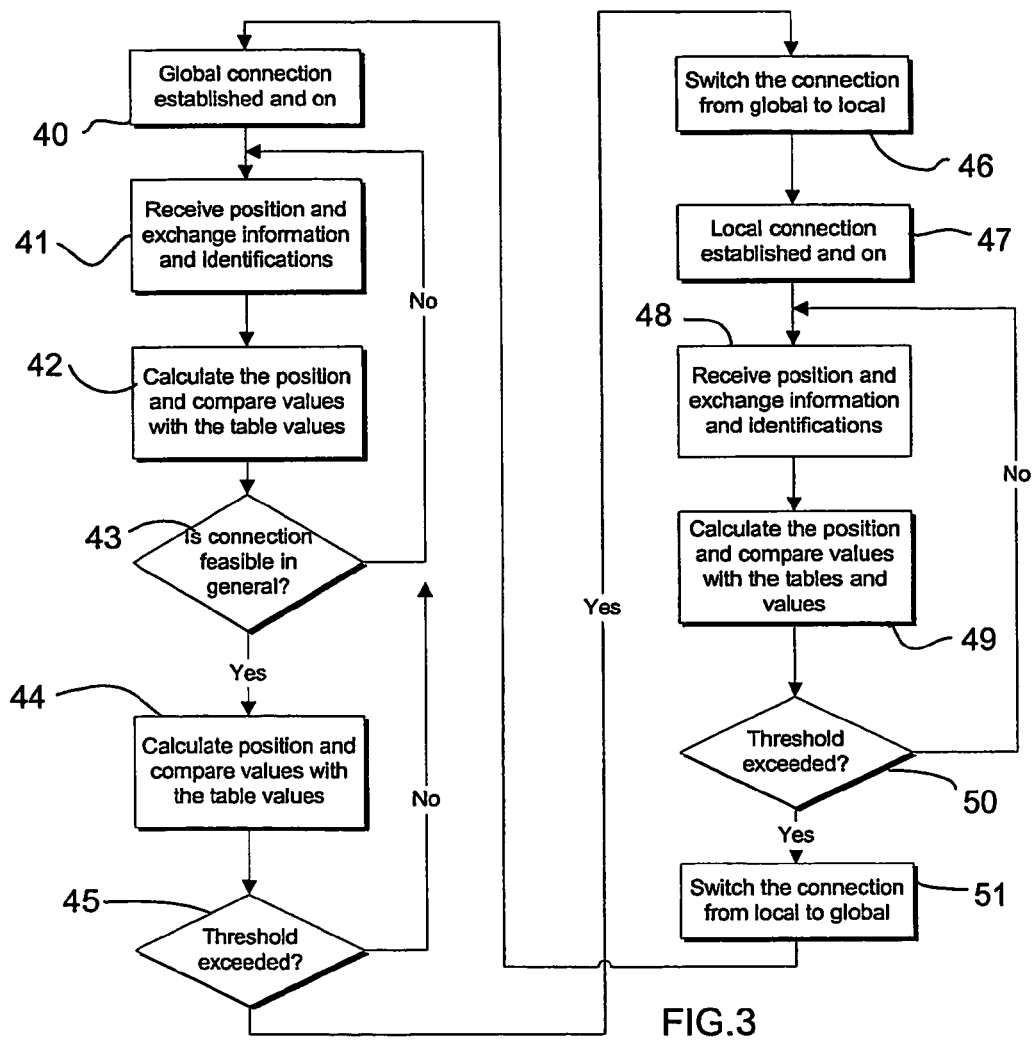
FIG. 3 is a flow chart illustrating operation of the mobile station of FIG. 1.

Referring to FIG. 3, the operation begins in this instance at step 40, which describes the connection status at this time. In this context, it will be appreciated that 'global connection' refers to connection via the base stations 30, 32-34 of the network 31. At step 41, the first MS 10 determines its location using its GPS receiver 23, and receives information identifying the location of the second MS 35.

At step 42, the positions of the two MSs 10, 35 are compared, and the distance between them calculated. This distance is then compared to values stored in a table which relate to predetermined feasibility parameters. The operation of step 42 is performed relatively infrequently, so as to save resources, e.g. processing resources and to avoid the need for frequent sending of location and other subsidiary information over the network 31. A decision is made at step 43 as to whether the connection is potentially feasible, and return is made to step 41 if a negative decision is made. Otherwise, the positions of the MSs 10, 35 are compared again at step 44, and the distance between them compared to the maximum permissible distance in step 45. A threshold, which is the maximum permissible distance, is set at a value equal to the sum of the radio coverage of the first and second MSs, which coverages are made available to the first MS 10 in any suitable manner. The threshold and the maximum permissible distances are stored in the database 24. This calculation is made significantly more frequently than the calculation of step 42. If the threshold is exceeded, a NO result returns the operation to step 41. If the threshold is not exceeded, a YES result causes the operation to progress to step 46. Here, direct mode communication is established between the first and second MSs 10, 35 in any suitable manner. The global communication may remain in place or it may be disconnected. By step 47, local connection, or direct mode communication, is established and on.

At step 48, the first MS 10 again determines its location using the GPS receiver, receives location information about the second MS 35, and determines the distance therebetween. At step 49, this distance is compared with the threshold used in step 45, and a decision made as to whether the threshold is exceeded at step 50 with a NO result returning the operation to step 48, and a YES result causing progression to step 51. It will be appreciated that a YES result is obtained from step 50 only when the first and second MSs 10, 35 have moved apart so that their radio coverages no longer overlap. In this case, the operation takes the appropriate step, step 51, of switching communication from local (direct mode) to global (i.e. via at least one BS 30). If the global connection was broken at step 41, then step 50 involves establishing a global connection, in any convenient manner.

In a further embodiment (not shown), the switching of a global connection to a local connection is carried out only if an MS determines that a channel of sufficiently high quality can be established. This is achieved by the sending of data from the first MS via the first BS 30, indicating the channel which is to be used, which information is then passed onto the second MS 35. The first MS 10 then transmits some test data via the identified channel, and this data is received by the second MS 35. The bit error rate (BER) of the received data is calculated in a conventional manner, and the BER transmitted to the first MS 10 either directly or using the global connection. The connection is switched from global to local at step 46 only if the first MS determines from the BER received from the second MS 35 that the propagation channel between the first and second MSs 10, 35 is of sufficiently high quality. Channel quality is determined continuously, along with the distance between the first and second MSs 10, 35, for the purpose of determining whether a switch from local to global communication should be made.

Many variations of this are possible. For example, any other measure of channel quality may be made and used for the purpose of deciding whether to switch, examples being received signal strength and packet error rate. Also, a measure of the quality of the propagation channel from the second MS 35 to the first MS 10 may be made and this may be dependent on how much data is required to be transmitted across that channel.

The operation of the flowchart of FIG. 3 does not need to be carried out by the first MS 10. Although it is preferred that the operation is carried out by the MS which determines that a higher bandwidth channel of communication is desired, this operation may be carried out instead by another MS or by the BS 30 or some other part of the network 31. Running the operation of the FIG. 3 flowchart other than in the first MS allows it to be of simpler design.

Figure 4:
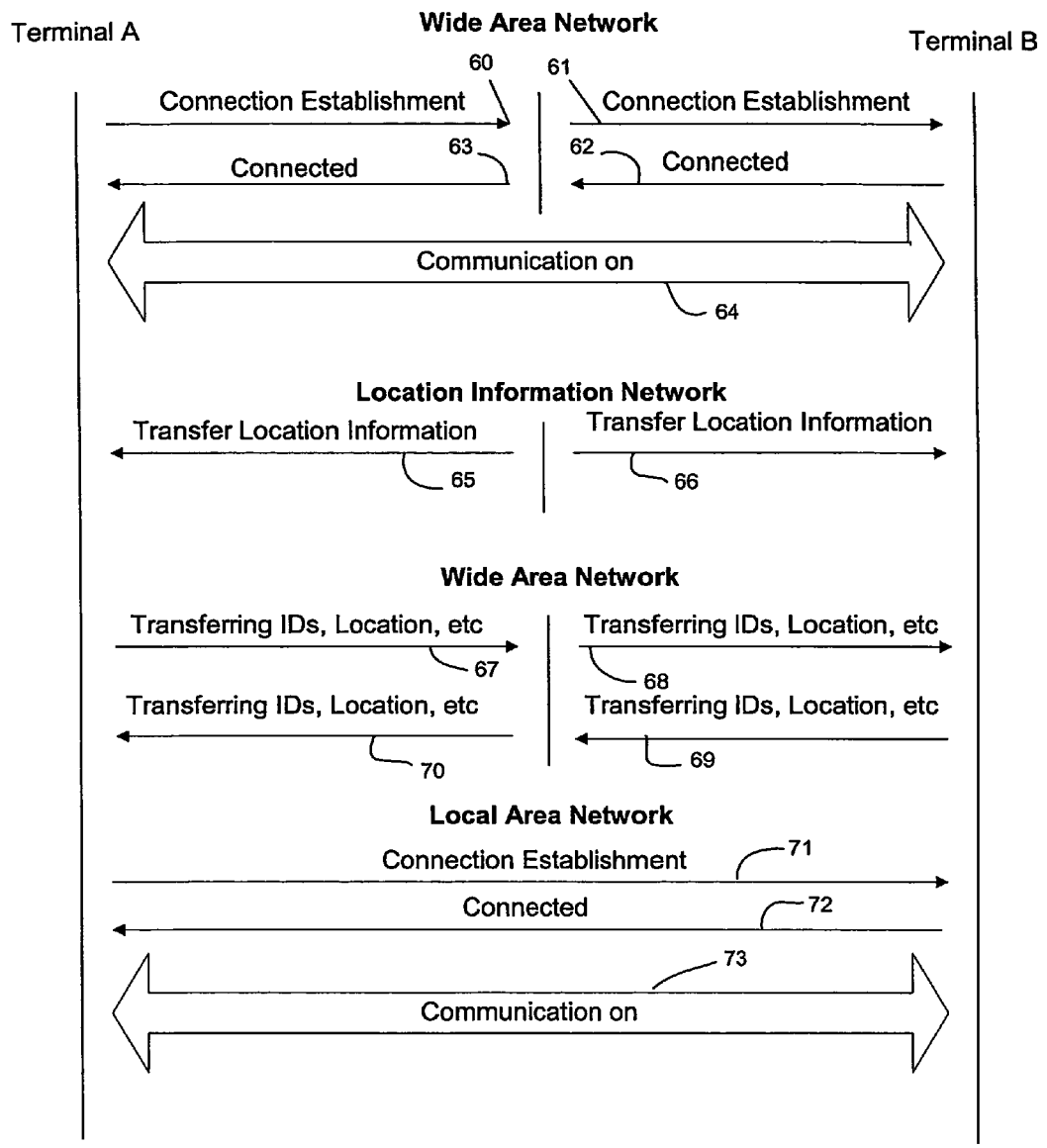
FIG. 4 is a chart showing signalling effected according to one embodiment.

Reference is now made to FIG. 4, which is a signalling chart having the first MS 10 on the left hand side (Terminal A), the second MS 35 on the right hand side (Terminal B), and the network 31 in the centre.

Referring to FIG. 4, connection established signals 60, 61 are passed from Terminal A to network 31 and from there, to terminal B respectively once a channel has been allocated respectively. Connected signals 62, 63 are sent from terminal B and from the network 31, respectively, in response. Communication between the terminals A and B is then established over a first channel, as is indicated at 64. The network 31 subsequently, and while the channel 64 is still open, transfers location information to terminal B and to terminal A with signals 65 and 66. In the embodiment of FIG. 3, it is not necessary to send signals 65 and 66 because location information is not stored on the network 31. In other embodiments (not shown) however, a location information network (which may or may not form part of the network 31) is used to calculate and to hold information about the locations of the MSs 10 and 35, and this information is passed to one or both of the MSs before direct-mode communication can be established. Identification and location information, as well as any other required information, is then passed between the terminals by signals 67 to 70. Afterwards, direct mode communication is established by the sending of a connection establishment signal 71 directly from terminal A to terminal B and by a communication signal 72 sent in reply. Direct mode communication is then established at 73.

The location of the first and/or second MSs 10, 35 may be determined in any suitable manner, such as by triangulating signals from plural base stations of known locations as is known. The triangulation calculations may be carried out by the network 31 or by the relevant MS 10, 35.

Location information for each MS may be stored by the network 31, and be accessible by any station as and when required. Location information may be transmitted to an MS by SMS message, which is particularly convenient since SMS messages can be received without interruption of any ongoing speech call.

In an alternative embodiment (not shown), the second channel has a bandwidth equal to or less than the first channel.

The invention claimed is:

1. A method comprising:
    effecting communication between first and second radio transceivers via a telecommunications network over a first channel using a first communications module associated with the first radio transceiver;
    determining the distance between the first and second radio transceivers;
    determining whether the distance between the two transceivers meets a predetermined criterion in relation to a threshold; and
    in response to a determination that the criterion is met, changing from communicating between the first and second radio transceivers via the telecommunications network over the first channel using the first communications module to communicating between the first and second radio transceivers in direct mode using a second communications module associated with the first radio transceiver over a second channel, the first and second channels being of different types.

2. A method as claimed in claim 1, in which the second channel has a greater bandwidth than the first channel.

3. A method as claimed in claim 1, further comprising, prior to the effecting direct mode communication step, estimating the quality of the second channel.

4. A method according to claim 1, in which the determining steps are carried out at the first radio transceiver.

5. A method according to claim 1, in which the distance determination step includes determining the locations of the first and second radio transceivers.

6. A method as claimed in claim 5, in which the location determination involves a satellite-based position system.

7. A method as claimed in claim 5, in which the location determination involves triangulating from plural fixed radio transceivers, preferably forming part of the telecommunications network.

8. A method as claimed in claim 1, in which the direct mode communication step is effected only if a bandwidth or other service demand exceeds the capability of the first channel.

9. A method as claimed in claim 1, in which the threshold is dependent on the sum of the radio coverage of the first and second radio transceivers.

10. A radio transceiver comprising:
    a first communications module for communicating with a remote radio transceiver via a telecommunications network over a first channel;
    a second communications module for communicating directly with a remote radio transceiver over a second channel, the first and second channels being of different channel types;
    a determiner for determining the distance between the radio transceiver and the remote transceiver, and for determining whether the distance meets a predetermined threshold; and
    a channel changer, responsive to a determination that the threshold is met, for changing from communicating with the first communications module via the telecommunications network over the first channel to direct mode communication between the transceiver and the remote transceiver with the second communications module over the second channel.

11. A radio transceiver as claimed in claim 10, in which the second channel has a greater bandwidth than the first channel.

12. A radio transceiver as claimed in claim 10, further comprising an estimator arranged to estimate the quality of the second channel.

13. A radio transceiver as claimed in claim 10, including a satellite positioning receiver, arranged to calculate the location of the transceiver.

14. A system comprising:
    first and second radio transceivers, wherein the first radio transceiver comprises:
    a first communications module for effecting communication between the first and second radio transceivers over a first channel; and
    a second communications module for communicating directly with a remote radio transceiver over a second channel, the first and second channels being of different channel types;
    the system further comprising:
    a determiner for determining the distance between the transceivers, and for determining if the distance meets a predetermined threshold; and
    a channel changer responsive to a determination that the threshold is met, for changing from communicating with the first communications module via the telecommunications network over the first channel to effect direct mode communication between the transceivers with the second communications module over the second channel.

15. A radio transceiver comprising:
    a first means for communicating with a remote radio transceiver via a telecommunications network over a first channel;
    a second means for communicating directly with a remote radio transceiver over a second channel, the first and second channels being of different channel types;
    means for determining the distance between the radio transceiver and the remote transceiver, and for determining whether the distance meets a predetermined threshold; and
    means, responsive to a determination that the threshold is met, for changing from communicating with the first means via the telecommunications network over the first channel to direct mode communication between the transceiver and the remote transceiver with the second means over the second channel.

16. A radio transceiver as claimed in claim 15, in which the second channel has a greater bandwidth than the first channel.

17. A radio transceiver as claimed in claim 15, further comprising an estimator arranged to estimate the quality of the second channel.

18. A radio transceiver as claimed in claim 15, including a satellite positioning receiver, arranged to calculate the location of the transceiver.

* * * * *